United States Patent Office 3,518,315
Patented June 30, 1970

3,518,315
ETHER PRODUCTION
Edgar J. Smutny, San Francisco, Calif., assignor to Shell Oil Company, New York, N.Y., a corporation of Delaware
No Drawing. Continuation-in-part of applications Ser. No. 455,965 and Ser. No. 456,001, both May 14, 1965. This application Nov. 6, 1967, Ser. No. 681,029
The portion of the term of the patent subsequent to Aug. 16, 1983, has been disclaimed
Int. Cl. C07c 43/20
U.S. Cl. 260—612
9 Claims

ABSTRACT OF THE DISCLOSURE

Aromatic 2,7-alkadienyl ethers, produced by reaction of certain α,ω-conjugated alkadienes and phenols, in the presence of a platinum, palladium or ruthenium compound as catalyst and a phenoxide anion catalyst promoter.

CROSS-REFERENCES TO RELATED APPLICATIONS

This application is a continuation-in-part of copending application of Smutny Ser. No. 455,965 filed May 14, 1965 and now abandoned, and also a continuation-in-part of copending application of De Acetis and Smutny Ser. No. 456,001 filed May 14, 1965, and now Pat. No. 3,432,465.

BACKGROUND OF THE INVENTION

Methods are available in the art for the dimerization of conjugated dienes under conditions whereby a derivative of the diene dimer is observed. In general, such methods produce a diene dimer moiety which is branched; for example, from the dimerization of butadiene is typically obtained a methylheptadiene moiety as the principal acyclic product type. General methods of producing diene dimer derivatives wherein the diene moieties have dimerized in a linear manner have not been available.

SUMMARY OF THE INVENTION

It has now been found that an improved dimerization process comprises the process of reacting phenols with conjugated alkadienes in the presence of certain metal compounds as catalyst and a phenoxide anion catalyst promoter. Although the mechanism of the condensation process is not completely understood, the process of the invention results in the efficient production of ethers, one moiety of which is derived from the phenol reactant and the other moiety of which may be considered as derived from a linear dimer of the diene reactant. By way of illustration, from the reaction of phenol and butadiene in the process of the invention is obtained 1-phenoxy-2,7-octadiene.

DESCRIPTION OF PREFERRED EMBODIMENTS

The conjugated diene employed as a reactant in the process of the invention is an α,ω-conjugated alkadiene having only hydrogen substituents on the terminal carbon atoms of the four-carbon chain. Dienes that possess non-hydrogen substituents on the internal, i.e., non-terminal, carbon atoms are suitably employed, provided that the internal-carbon substituents do not unduly sterically hinder the diene dimerization. A preferred class of diene reactants comprises butadiene having from 0 to 2 internal-carbon methyl substituents. These diene compounds are butadiene, isoprene and 2,3-dimethylbutadiene. Of these, butadiene is particularly preferred.

The process of the present invention is broadly applicable to a wide variety of compounds incorporating within their structure at least one phenolic hydroxyl group and the process is suitably employed with phenols of complex or of comparatively simple structure. Best results are obtained when phenols of comparatively simple structure are employed such as when the phenol reactant comprises a mono- or di-nuclear aromatic compound possessing at least one hydroxyl substituent on at least one six-membered carbocyclic aromatic ring and having from 6 to 24 carbon atoms. The phenol reactant has from 1 to 3, preferably from 1 to 2, hydroxyl groups attached to each ring, and when the phenol is dinuclear, the aromatic rings are suitably fused, are attached directly by carbon-carbon bonds between ring carbon atoms, or are connected by an alkylene bridge of from 1 to 12 carbon atoms. The phenol reactant is an unsubstituted phenol, that is, contains no substituents other than hydrogen and hydroxyl on the aromatic ring(s) or alternatively is a substituted phenol containing ring-carbon substituents other than hydrogen or hydroxyl, which substituents are hydrocarbyl, i.e., contain only atoms of carbon and hydrogen, or are non-hydrocarbyl containing atoms such as halogen, nitrogen or oxygen. When the phenol reactant is substituted, it is preferred that each substituent be an electron-donating substituent, which term is herein employed to indicate a substituent which is generally considered to be ortho-para directing when attached to an aromatic ring. Illustrative of such electron-donating substituents are alkyl including cycloalkyl, halogen, particularly halogen of atomic number from 17 to 35, i.e., chlorine and bromine, alkoxy, aryloxy, dialkylamino, halomethyl and the like.

Exemplary mononuclear phenol reactants include phenol, p-chlorophenol, m-bromophenol, p-ethylphenol, 2,6-dimethylphenol, p-tert-butylphenol, p-methoxyphenol, p-cyclohexylphenol, m-hexylphenol, 2,4-diethylphenol, p-dimethylaminophenol, hydroquinone, resorcinol, ethylhydroquinone, 2,5-dichlorohydroquinone, phloroglucinol, and 5-methoxyresorcinol. Dinuclear phenols are illustrated by dinuclear phenols wherein the rings are fused, such as α-naphthol, β-naphthol, 1,4-dihydroxynaphthalene, 1,5-dihydroxynaphthalene, 1,4,6 - trihydroxynaphthalene, 4-chloro-1,8-dihydroxynaphthalene, 4,8 - dimethyl-1,5-dihydroxynaphthalene and 8-hydroxyquinoline; dinuclear phenols wherein the rings are attached directly by carbon-carbon bonds between ring carbon atoms, e.g., phenylphenol, 4,4'-dihydroxybiphenol, 2,4'-dihydroxybiphenyl, 3,4',5-trihydroxybiphenyl, 2,2'-dichloro-4,4'-dihydroxybiphenyl, 3,3'-dihydroxy-5,5'-diethylbiphenyl, and 3,4'-dihydroxy-5-butylbiphenyl and dinuclear phenols wherein the rings are joined by an alkylene bridge of from 1 to 12 carbon atoms such as bis(4-hydroxyphenyl)methane, 2,2-bis(4-hydroxyphenyl)propane, 1,2-bis-(3,5 - dihydroxyphenyl)ethane, 3,3-bis(2-chloro-4-hydroxyphenyl)hexane, bis(3-hydroxy - 5 - methylphenyl)methane, bis(2,6-dimethyl-4-hydroxyphenyl)-methane and 2,2-bis(2-propoxyhalohydrocarbon phenols, generically designated (halo)-hydrocarbon phenols, are preferred over phenols having non(halo)hydrocarbyl substituents, and particularly preferred are unsubstituted mono-to dinuclear phenols wherein each aromatic ring possesses a single hydroxyl substituent.

The optimum ratio of phenol reactant to conjugated diene will depend in part upon the functionality of the phenol, that is, the number of phenolic hydroxyl groups present in the phenol reactant molecule, as well as the extent of reactant conversion that is desired. Ratios of moles of diene to moles of phenolic hydroxyl group as low as about 1:4 are suitable if only low conversion, e.g., 5–10%, is employed. However, to obtain higher conversions, an excess of diene is preferred and ratios of moles of diene to moles of phenolic hydroxyl group from about 3:1 to about 10:1 are more satisfactory, with best results being obtained when ratios of moles of diene to moles of phenolic hydroxyl group from 3.5:1 to about 6:1 are utilized.

The catalyst employed in the process of the invention is a metal compound wherein the metal is selected from palladium, platinum and ruthenium. Particularly preferred as catalyst is a compound of a VIII–C metal having an atomic number from 46 to 78 inclusive, i.e., palladium and platinum. Most preferred as catalyst is a compound of palladium. Without wishing to be bound by any particular theory, it appears that the chemical transformations during the course of the reaction which involve the metal compound are quite complex, probably involving the formation and destruction of complexes between the metal moiety and the diene reactant and/or the presumed diene dimer intermediate. Metal compounds that are soluble in the reaction medium as well as compounds that are superficially insoluble in the reaction system are operable, apparently in the latter case through dissolved metal compound moieties, the formation of which is probably influenced by interaction with the diene reactant and/or the phenol reactant and the solubilization resulting therefrom. To obtain optimum reaction rates, the metallic compound is preferably soluble in the reaction mixture or serves as a precursor of a soluble metal compound. It is apparent, however, that the metal-containing catalyst may be employed in any form which serves to introduce the metal compound into the reaction system.

In one modification of the invention, the metal-containing catalyst is introduced as a salt, and palladium, platinum or ruthenium salts of organic or inorganic acids which are strong or weak acids are suitable. When the metal containing catalyst is provided as a salt, best results are obtained through utilization of a metal halide, e.g., platinum chloride, platinum bromide, palladium chloride, palladium iodide, ruthenium chloride, ruthenium bromide and the like, and particularly suitable results are obtained when metal chlorides are employed. Also suitable are salts wherein the metal is present in the anion, as for example in the case of palladium, the use of a chloropallidate salt is satisfactory, particularly an alkali metal pallidate, e.g., sodium chloropallidate.

In an alternate modification of the process, the catalyst is provided in the form of a metal complex. Employing palladium for purposes of illustration, one type of suitable complex is a complex of a palladium salt and organic ligand, such as is represented by the formula $$L_2PdX_2$$

wherein X is halogen, preferably chlorine, and L is a tertiary nitrogen-containing ligand complexed with the palladium through the nitrogen moiety thereof. Illustrative of such L groups are nitriles, both aromatic and aliphatic, such as benzonitrile, propionitrile, acetonitrile, toluonitrile and the like; heterocyclic tertiary nitrogen compounds such as pyridine, quinoline, isoquinoline, picoline and lutidine; and tertiary aliphatic amines such as triethylamine, tributylamine, and dimethylhexylamine.

An equally suitable type of palladium complex is a π-allyl complex of palladium. The simplest member of this class is a π-allyl palladium salt which, when the anion is chlorine, is represented by the following formula.

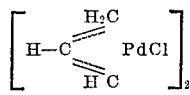

The preparation of this complex and related complexes is described by Huttel et al., Angew. Chemie, 71, 456 (1959). Similar π-allyl complexes are represented by the formula

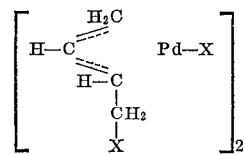

wherein X is halogen, which complexes are conveniently prepared by reaction of a conjugated diene, e.g., butadiene, with palladium halide in hydrocarbon media in the presence of other ligands, e.g., benzonitrile. Although alternate methods are available for calculating the oxidation state of the palladium present in such π-allyl complexes, it is herein considered that the palladium is palladium (II). It should be understood that analogous complexes of platinum and ruthenium are also suitable as catalysts in the process of the invention, although as previously stated, palladium-containing catalysts are generally to be preferred.

In an additional modification of the process of the invention, the metal-containing catalyst is provided in the form of a commercial supported elemental metal catalyst. Although the apparent oxidation state of the metal in such supported catalysts is zero, which elemental metal is not soluble in the reaction mixture and therefore does not act directly as a catalyst, sufficient metallic species of ionic character are present as impurities in commercial "metal (O)" catalyst so as to enable such a catalyst to be employed as a source of metal compound.

It is considered that in each above case the palladium or platinum is added as a palladium (II) or platinum (II) compound and the ruthenium is added as a ruthenium (III) compound, which compounds serve as catalyst or catalyst precursor in the process of the invention. Largely for reasons of convenience and economy, the preferred metal-containing catalyst is palladium chloride.

The process of the invention is characterized by the requirement for only catalytic quantities of platinum, palladium or ruthenium compound. Although utilization of larger amounts of metal-containing catalyst is not detrimental to the process of the invention, amounts larger than about 1% mole based on total reactants are not generally required. Amounts of metal compound less than about 0.001% mole on the same basis are generally unsuitable because of the inevitable physical losses of catalyst during reaction and processing. In general, amounts of catalyst from about 0.01% mole to about 0.5% mole based on total reactants are satisfactory and are preferred.

Although in certain applications the metal compound alone serves as an effective catalyst, the activity of the metal compound is greatly enhanced by the presence within the reaction mixture of a phenoxide anion catalyst promoter. By the term "phenoxide anion" as employed herein is meant the anion obtained by the removal of the hydrogen moiety of at least one phenolic hydroxyl group of a phenol reactant as defined above. It is not required that the phenoxide anion employed as catalyst promoter correspond to the phenol reactant undergoing reaction, and when the structure of the phenol reactant undergoing reaction is relatively complex, it may be preferable to employ a simpler phenoxide anion as the catalyst promoter. For example, when 2,6-dimethylphenol is reacted with conjugated diene in the process of the invention, 2,6-dimethylphenoxide anion is suitably employed as the catalyst promoter, although alternatively the phenate anion, i.e., the anion produced by removal of the acidic hydrogen of phenol, is also suitably employed to promote catalyst activity. When a di- or polyhydric phenol reactant is utilized, any anion derived therefrom is suitable. For example, to promote catalyst activity for reaction of a conjugated diene with 4,4'-dihydroxybiphenyl, either the corresponding mono-anion or the corresponding di-anion is suitably employed, as well as phenoxide anions of less complex structure, e.g., the phenate anion. Of course, phenoxide anions of more complex structure are also suitable.

The presence of phenoxide anion in the reaction system may be brought about by any convenient method. In one modification of the process of the invention, the phenoxide anion is prepared in situ by the addition to the reaction mixture of a base which is preferably more basic than the phenoxide anion. Reaction of added base with the phenol reactant results in the formation of the corresponding phenoxide anion through a process of neutralization. Exemplary bases employed in an in situ formation of phenoxide anion are organic bases, particularly nitrogen-containing bases such as ammonia and tertiary amines such as trimethylamine, triethylamine, pyridine and quinoline. In the preferred modification of the process of the invention, phenoxide anion is added as a preformed material, customarily in the form of a soluble metal salt of a suitable phenol, e.g., either the salt of the phenol undergoing reaction or the salt of a comparable phenol of less complex structure. Suitable metal salts of phenols include alkali metal phenoxides, particularly sodium phenoxides, which are conveniently prepared by neutralization of a suitable phenol with alkali metal base, for example, an alkali metal hydroxide such as sodium hydroxide, or by direct reaction of the phenol with the alkali metal either in situ or separately from the reaction system.

The role of the phenoxide anion in the process of the invention is not completely understood. Without wishing to be bound by any particular theory, it appears probable that the phenoxide anion serves as a metal-bound ligand in metal-diene complexes which are possible intermediate species in the formation of the aryl alkadienyl ethers of the invention. The phenoxide anion is desirably present in molar amounts that are equal to or greater than the molar amount of metal-containing catalyst compound. Molar ratios of phenoxide anion to metal compound from about 1:1 to about 8:1 are satisfactory, although molar ratios from about 1:1 to about 4:1 are preferred.

The process of the invention is typically conducted by charging the reactants, catalyst and catalyst promoter to an autoclave or similar reactor and maintaining the reaction mixture at reaction temperature until reaction is complete. The method of mixing is not critical although it is generally preferred to mix the reactants and add the catalyst and catalyst promoter thereto. The reaction is suitably conducted throughout a wide range of reaction temperatures and pressures, so long as the reactants are maintained substantially in the liquid phase. Reaction temperatures from about −20° C. to about 150° C. are satisfactory, although temperature from about 0° C. to about 130° C. are preferred and best results are obtained when a temperature from about 80° C. to about 125° C. is employed. Typical reaction pressures vary from about 1 atmosphere to about 80 atmospheres. Frequently, good results are obtained when the reaction pressure is autogenetic, that is, the pressure generated when the reactants are maintained at reaction temperature in a sealed reaction vessel. Such pressures are from about 1 atmosphere to about 20 atmospheres.

The process of the invention is conducted in the presence or in the absence of a solvent. In the modification wherein solvent is employed, solvents that are suitable are those capable of dissolving the reactants, catalyst and catalyst promoter, and are inert to the reactants and the products prepared therefrom. Exemplary solvents are ethers, including dialkyl ethers such as diethyl ether, dibutyl ether and methyl hexyl ether; alkyl aryl ethers such as anisole and phenyl butyl ether; cyclic ethers such as tetrahydrofuran, dioxane and dioxolane; and lower alkyl ethers (full) of polyhydric alcohols or polyoxyalkylene glycols such as ethylene glycol dimethyl ether, diethylene glycol dimethyl ether, tetraethyene glycol dimethyl ether and glycerol triethyl ether; aromatic hydrocarbons such as benzene, toluene and xylene; N,N-dialkyl alkanoic acid amides, e.g., dimethylformamide and N,N - diethylacetamide; halogenated hydrocarbons such as chloroform, carbon tetrachloride, tetrachloroethylene, methylene chloride and bromoform; sulfoxides such as dimethylsulfoxide; and nitriles such as acetonitrile and benzonitrile. The solvent, if any, is employed in molar excess over the amount of total reactants, and in general, moles of solvent up to about 150 moles per mole of total reactants are satisfactory. For convenience, it is generally preferred to conduct the reaction in the absence of added solvent.

Subsequent to reaction, the reaction mixture is separated and the desired product recovered by conventional means such as selective extraction, fractional distillation and chromatographic techniques.

The products of the invention are aryl alkadienyl ethers illustratively produced by dimerization of the diene reactant and reaction of the diene dimer with the phenol reactant to etherify at least one of the phenolic hydroxyl groups. In terms of the phenol reactants as previously defined, the products of the invention are aryl alkadienyl ethers wherein the alkadienyl moiety is 2,7-octadienyl or methyl-substituted 2,7-octadienyl depending upon the particular alkadiene reactant employed, and the aryl moiety is that moiety illustratively obtained by removal of at least one hydroxyl group of a mono- to dinuclear phenol possessing from 1 to 3 phenolic hydroxyl groups on each six-membered carbocyclic aromatic ring. The octadienyl moiety will have from 0 to 4 methyl substituents, depending upon the degree of methyl substitution on the diene reactant. When butadiene is employed as the diene reactant, the alkadienyl moiety will be 2,7-octadienyl. Alternatively, when the diene reactant is isoprene, the alkadienyl moiety is principally 3,7-dimethyl-2,7-octadienyl and/or 3,6-dimethyl-2,7-octadienyl and when 2,3-dimethylbutadiene is the diene reactant, the alkadienyl moiety is 2,3,6,7-tetramethyl-2,7-octadienyl. Generically these alkadienyl moieties are represented by the formula

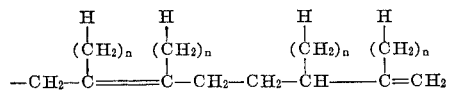

wherein each *n* independently is a whole number from 0 to 1 inclusive. Although it is within the contemplated scope of the invention to prepare alkadienyl ethers of polyhydric phenols wherein only a portion of the phenolic hydroxyl groups within the phenol reactant molecule are etherified, the preferred products of the invention are those wherein each phenolic hydroxyl present within the phenol reactant has been etherified with an alkadienyl moiety as previously defined.

It will be apparent that a wide variety of aryl alkadienyl ethers can be prepared by the process of the invention by varying the phenol and diene reactants. Illustrative of these products are 1-phenoxy-2,7-octadiene prepared from phenol and butadiene, 1-phenoxy-3,6-dimethyl-2,7-octadiene and 1-phenoxy-3,7-dimethyl-2,7-octadiene prepared from phenol and isoprene, and 1-phenoxy-2,3,6,7-tetramethyl-2,7-octadiene prepared from phenol and 2,3-dimethylbutadiene, as well as other illustrative products such as 1-(p-chlorophenoxy)-2,7-octadiene,
1-(2,6-diethylphenoxy)-3,6-dimethyl-2,7-octadiene,
2,2-bis[4-(2,7-octadienyloxy)phenyl]propane,
1,4-bis(2,7-octadienyloxy)benzene,
1,5-bis(3,7-dimethyl-2,7-octadienyloxy)naphthalene,
3,3′-bis(2,3,6,7-tetramethyl-2,7-octadienyloxy)biphenyl,
1-(p-methoxyphenoxy)-2,7-octadiene,
1-(3,5-dibromophenoxy)-2,7-octadiene,
bis[3-(3,6-dimethyl-2,7-octadienyloxy)phenyl]-methane
and the like.

The products of the invention are useful in a variety of applications. The remaining unsaturated linkages are hydrated, as by sulfation with sulfuric acid followed by aqueous hydrolysis of the initially formed sulfate ester, to an ether-alcohol which is reacted with phthalic acid or other carboxylic acid to form ether-esters useful as plasticizers for polyvinyl chloride, polyvinyl acetal resins, polystyrene, polyvinyl halide thermoplastics and the like according to procedures disclosed in U.S. 2,371,131, U.S. 2,222,490, U.S. 2,166,557 and U.S. 2,744,877. The ethylenic linkages serve as a reactive site for homopolymerization or copolymerization, e.g., titanium halide-aluminum alkyl catalyzed copolymerization with relatively larger proportions of ethylene or propylene to form thermoplastics. The ethylenic linkages are epoxidized as by treatment with peracetic acid or other percarboxylic acids to form the corresponding epoxy derivatives from which epoxy resins useful in castings and laminates are prepared by curing with carboxylic acid anhydrides, e.g., hexahydrophthalic anhydride. The octadienyl ethers of the invention are hydrolyzed in the presence of acid catalysts to form the corresponding octadienyl alcohols from which carboxylate esters, e.g., the bis(octadienyl)phthalates, are formed by reaction with carboxylic acids, e.g., phthalic acid, which carboxylate esters are useful as plasticizers in polyvinyl chloride and like materials by procedures similar to those described, for example, in U.S. 3,172,904. The octadienyl alcohols are also converted by conventional procedures, e.g., reaction with chlorosulfonic acid followed by neutralization with sodium hydroxide, to the corresponding alcohol sulfates which are useful as detergents in synthetic household laundry products.

To further illustrate the process of the invention, and the novel products obtained thereby, the following examples are provided. It should be understood that the details thereof are not to be regarded as limitations, as they may be varied as will be understood by one skilled in this art.

EXAMPLE I

A series of experiments were conducted employing various phenols and butadiene as reactants. In each case, the phenol and butadiene were charged to a pressure reactor as liquids and 1 g. of palladium chloride and 2 g. of sodium phenate were added. The reactor was sealed and maintained at 100° C. for 22 hours, and then cooled and opened. The contents were washed with methylene chloride or benzene and were fractionally distilled subsequent to filtration. The product mixture was analyzed by gas-liquid chromatography. The results of this series are shown in Table I.

TABLE I

| Substituted phenol | Moles phenol | Moles butadiene | Phenol conversion, percent | Yield of octadienyl ether based on phenol converted |
|---|---|---|---|---|
| p-H | 0.425 | 1.66 | 96 | 94 |
| p-OCH$_3$ | 0.43 | 1.66 | 48 | 70 |
| p-Cl | 0.43 | 1.66 | 100 | 93 |
| p-CH$_3$ | 0.36 | 1.66 | 58 | 71 |
| 2,6-di-CH$_3$ | 0.5 | 1.66 | 12 | 80 |

The products of the reactions in the above series were separated by chromatographic techniques and characterized by analysis and/or physical properties. These data are provided in Table II wherein the aryl 2,7-octadienyl ether products are listed according to the phenol from which they were prepared.

TABLE II

| Phenol precursor | Empirical formula | Anal. calc. C, percent wt. | Anal. calc. H, percent wt. | Anal. calc. Mole wt. | Anal. found C, percent wt. | Anal. found H, percent wt. | Anal. found Mole wt. | Boiling point |
|---|---|---|---|---|---|---|---|---|
| p-OCH$_3$ | C$_{15}$H$_{20}$O$_2$ | 77.5 | 8.7 | 232 | 78.1 | 8.8 | 225±9 | 115° C./0.2 mm. |
| p-Cl | C$_{14}$H$_{17}$OCl | 71.0 | 7.2 | 237 | 72.6 | 7.3 | 235±9 | 115° C./2 mm. |
| p-CH$_3$ | C$_{15}$H$_{20}$O | 83.8 | 9.3 | | 83.1 | 9.2 | | 95° C./2 mm. |
| p-OH | C$_{22}$H$_{30}$O$_2$ | 80.9 | 9.3 | 326 | 80.3 | 9.2 | 356±12 | |
| 2,6-di-CH$_3$ | C$_{16}$H$_{22}$O | 83.5 | 9.6 | 230 | 82.8 | 9.6 | 231±6 | 135° C./5 mm. |

EXAMPLE II

To a cooled pressure reactor was charged 50 g. of 2,2-bis(4-hydroxyphenyl)propane, 1.9 g. of its sodium salt (prepared by reaction of sodium hydride with the phenol), 1.0 g. of palladium chloride and 90 g. of butadiene. The reactor was sealed and maintained at 100° C. for 48 hours. The reactor was cooled and opened and the product mixture was filtered and concentrated to produce 93 g. of 2,2-bis[4 - (2,7 - octadienyloxy)phenyl]propane. Microhydrogenation of the product indicated a hydrogen uptake of 4.1 moles of hydrogen per mole of product, confirming the presence of four carbon-carbon double bonds. The analysis of the non-hydrogenated product was as follows.

Calculated: C, 83.7% wt.; H, 9.1% wt.; mole wt., 444.
Found: C, 83.9% wt.; H, 9.1% wt.; mole wt., 470±25.

By a similar procedure, sodium phenate was prepared in situ by the addition of metallic sodium to excess phenol. Palladium chloride and butadiene were then introduced and the reaction mixture was maintained at from −3° C. to 7° C. When the reaction was complete, the product mixture was filtered and distilled to give 1-phenoxy-2,7-octadiene. The nuclear magnetic resonance spectrum was consistent with this formula. The analysis of the product was as follows.

Calculated: C, 83.1% wt.; H, 8.9% wt.; mole wt., 202.
Found: C, 82.9% wt.; H, 8.9% wt.; mole wt., 202±6.

EXAMPLE III

To a reaction vessel was charged 0.32 mole of phenol, 1.0 mole of isoprene, 1.0 g. of palladium chloride and 2.0 g. of sodium phenate. The reaction mixture was heated under reflux for 18 hours. Subsequent to filtration, the product mixture was fractionally distilled and analyzed by gas-liquid chromatography. The conversion of phenol was 26% and the yield of 1-phenoxy-dimethyl-2,7-octadiene was 95% based upon the phenol converted.

EXAMPLE IV

A series of experiments was conducted involving the reaction of phenol and butadiene in various solvents. In each case, the indicated amounts of phenol, butadiene, palladium chloride and 0.29 g. of sodium phenate were charged to a glass ampoule together with the solvent and the reaction mixture was maintained at ambient temperature for one week. The ampoules were opened, and, after filtration, the product mixture was analyzed by gas-liquid chromatography. The results are given in Table III wherein the yield is yield of 1-phenoxy-2,7-octadiene based on phenol charged.

TABLE III

| Solvent, g. | Phenol, moles | Butadiene, moles | PdCl$_2$, g. | Yield percent |
|---|---|---|---|---|
| Dimethylsulfoxide, 8.4 | 0.022 | 0.083 | 0.12 | 6 |
| Tetrahydrofuran, 7.1 | 0.022 | 0.094 | 0.14 | 60 |
| Benzene, 6.9 | 0.022 | 0.07 | 0.15 | 65 |
| Dimethylforamide, 7.2 | 0.023 | 0.061 | 0.11 | 67 |
| Chloroform, 10.0 | 0.024 | 0.083 | 0.10 | 100 |
| Acetonitrile, 5.8 | 0.021 | 0.08 | 0.11 | 100 |

EXAMPLE V

A series of experiments was conducted relating to the reaction of phenol with butadiene in the presence of palladium chloride and various bases. The experimental procedure was similar to that of Example IV. The results are shown in Table IV, wherein the indicated yield is yield of 1-phenoxy-2,7-octadiene based on phenol charged.

TABLE IV

| Base, g. | PdCl$_2$, g. | Phenol, moles | Butadiene, moles | Yield, percent |
|---|---|---|---|---|
| Ammonia | 0.18 | 0.047 | 0.08 | 5 |
| Pyridine | [1] 0.37 | 0.046 | 0.04 | 7 |
| Triethylamine, 0.14 | 0.18 | 0.046 | 0.056 | 32 |
| Sodium Phenate, 0.2 | 0.18 | 0.057 | 0.12 | 86 |

[1] Provided as the bis(pyridine) palladium chloride complex.

EXAMPLE VI

A series of experiments was conducted using various complexes of palladium as the source of soluble palladium. In each case the reactants, catalyst and base were sealed in a glass ampoule and shaken at ambient temperature for one week. The product mixture was then removed, filtered, and analyzed by gas-liquid chromatography to determine the yield of 1-phenoxy-2,7-octadiene based on phenol charged. For convenience, the catalysts employed in this series are given letter designations in the following table, Table V, wherein the results of this series are shown. Catalyst A is 3-(methoxymethyl)-π-allyl palladium chloride, catalyst B is 2-methyl-3-(methoxymethyl)-π-allyl palladium chloride, catalyst C is π-allyl palladium chloride and catalyst D is bis(benzonitrile)palladium chloride.

TABLE V

| Catalyst, g. | Base, g. | Phenol, moles | Butadiene, moles | Yield, percent |
|---|---|---|---|---|
| A, 0.28 | Sodium Phenate, 0.2 | 0.043 | 0.24 | 82 |
| A, 0.24 | Triethylamine, 0.1 | 0.043 | 0.18 | 92 |
| B, 0.26 | Sodium Phenate, 0.2 | 0.043 | 0.27 | 78 |
| B, 0.27 | Triethylamine, 0.1 | 0.044 | 0.26 | 96 |
| C, 0.5 | Sodium Phenate, 0.3 | 0.21 | 0.83 | 95 |
| D, 0.38 | Sodium Phenate, 0.2 | 0.044 | 0.24 | 95 |

EXAMPLE VII

By a procedure similar to that of Example IV, phenol was reacted with butadiene in the presence of other metal salts and commercial supported "metal (O)" catalysts. The results of this series is shown in Table VI. The indicated yield is the yield of 1-phenoxy-2,7-octadiene based on phenol charged.

TABLE VI

| Catalyst, g. | Sodium phenate, g. | Phenol, moles | Butadiene, moles | Yield, percent |
|---|---|---|---|---|
| PtCl$_2$, 0.1 | 0.2 | 0.045 | 0.35 | 98 |
| RuCl$_3$, 0.29 | 0.37 | 0.065 | 0.15 | 5 |
| 5% Pd/BaSO$_4$, 2.0 | 0.2 | 0.053 | 0.14 | 86 |
| 10% Pt/C, 1.95 | 0.2 | 0.044 | 0.17 | 88 |
| 5% Ru/C, 1.8 | 0.2 | 0.047 | 0.15 | 13 |

For purposes of comparison, experiments were conducted employing commercial supported catalysts which had been treated with hydrogen prior to reaction to more completely reduce any metal compound impurities contained therein. In each case, the yield of 1-phenoxy-2,7-octadiene obtainable by use of such supported catalysts decreased upon treatment with hydrogen prior to reaction.

I claim as my invention:

1. The process of producing aryl alkadienyl ethers by contacting (a) a mono- to dinuclear phenol reactant having from 6 to 24 carbon atoms and from 1 to 2 phenolic hydroxyl groups attached to each aromatic ring with (b) from about 0.25 to about 10 moles per mole of phenolic hydroxyl group of conjugated diene selected from butadiene, isoprene and 2,3-dimethylbutadiene, in the presence of from about 0.001% mole to about 1% mole based on total reactants of a soluble metal compound as catalyst wherein the metal is palladium, platinum or ruthenium, and from 1 mole to about 8 moles per mole of said catalyst of phenoxide anion catalyst promoter, said phenoxide anion corresponding to that moiety produced by removal of at least one hydroxylic hydrogen from said phenol, in the liquid phase at a temperature from about −20° C. to about 150° C.

2. The process of claim 1 wherein said phenol reactant is a (halo)hydrocarbon phenol reactant.

3. The process of claim 2 wherein metal is palladium.

4. The process of claim 3 wherein the catalyst promoter is provided as alkali metal phenate.

5. The process of claim 3 wherein the (halo)hydrocarbon phenol reactant is phenol.

6. The process of claim 3 wherein the (halo)hydrocarbon phenol reactant is 2,2-bis(4-hydroxyphenyl)propane.

7. The process of claim 3 wherein the palladium compound catalyst is palladium chloride and the phenoxide anion is provided as alkali metal salt of said phenol reactant.

8. The process of claim 7 wherein the phenol reactant is phenol, the alkali metal salt of the phenol reactant is sodium phenate and said contacting is conducted at a temperature from about 0° C. to about 130° C.

9. The process of claim 3 wherein the phenol reactant is 2,2-bis(4-hydroxyphenyl)propane, the palladium compound catalyst is palladium chloride, the phenoxide anion catalyst promoter is sodium phenate and said contacting is conducted at a temperature from about 0° C. to about 130° C.

References Cited

UNITED STATES PATENTS 3,267,169  8/1966  Smutny _____ 260—682

OTHER REFERENCES

Tsuji: Jour. Soc. of Org. Syn. Chem., Japan, vol. 22, No. 11, November 1964, p. 888.

BERNARD HELFIN, Primary Examiner

U.S. Cl. X.R.

252—161; 260—613, 475, 31.8, 62, 348, 2, 632, 459